(12) United States Patent
Dugan

(10) Patent No.: US 9,079,545 B2
(45) Date of Patent: Jul. 14, 2015

(54) GEAR SHIFT MOUNTED ACCESSORY HOLDER

(75) Inventor: James A. Dugan, Indianapolis, IN (US)

(73) Assignee: James A. Dugan, Carmel, IN (US)

( * ) Notice: Subject to any disclaimer, the term of this patent is extended or adjusted under 35 U.S.C. 154(b) by 588 days.

(21) Appl. No.: 13/342,543

(22) Filed: Jan. 3, 2012

(65) Prior Publication Data

US 2012/0168482 A1 Jul. 5, 2012

Related U.S. Application Data

(60) Provisional application No. 61/429,331, filed on Jan. 3, 2011.

(51) Int. Cl.
*B60R 11/02* (2006.01)
*B60R 11/00* (2006.01)

(52) U.S. Cl.
CPC ............. *B60R 11/02* (2013.01); *B60R 11/0241* (2013.01); *B60R 2011/001* (2013.01); *B60R 2011/0059* (2013.01); *B60R 2011/0075* (2013.01); *B60R 2011/0078* (2013.01); *B60R 2011/0089* (2013.01)

(58) Field of Classification Search
CPC .................... B60R 2011/0075; B60R 11/0241
USPC ................. 224/282, 539, 558, 929; 74/551.8; 200/61.28, 61.88
See application file for complete search history.

(56) References Cited

U.S. PATENT DOCUMENTS

| | | | |
|---|---|---|---|
| 1,730,790 A * | 10/1929 | Squires | 40/644 |
| 1,839,039 A | 8/1930 | Maggous | |
| 1,828,896 A | 10/1931 | Hershey | |
| 1,862,964 A | 6/1932 | Lilligren | |
| 1,993,938 A | 3/1935 | McDonald | |
| 4,560,831 A | 12/1985 | Bast et al. | |
| 4,643,342 A * | 2/1987 | Borelli, III | 224/541 |
| 5,390,609 A * | 2/1995 | McKee | 108/45 |
| 5,481,077 A * | 1/1996 | Clegg et al. | 200/61.88 |
| 5,493,880 A * | 2/1996 | Jang | 70/202 |
| 5,515,345 A * | 5/1996 | Barreira et al. | 369/6 |
| 5,602,525 A | 2/1997 | Hsu | |
| 5,813,579 A * | 9/1998 | Hendrickson | 224/42.11 |
| D402,666 S | 12/1998 | Golder | |
| D407,408 S | 3/1999 | Hoff | |
| 5,957,001 A | 9/1999 | Gualtieri et al. | |
| 6,038,937 A * | 3/2000 | Van Order et al. | 74/473.1 |
| 6,062,518 A | 5/2000 | Etue | |
| 6,145,401 A * | 11/2000 | Brush et al. | 74/473.12 |
| 6,158,301 A * | 12/2000 | Smart | 74/558.5 |
| 6,539,358 B1 * | 3/2003 | Coon et al. | 704/275 |
| 6,591,085 B1 * | 7/2003 | Grady | 455/42 |
| 6,930,594 B1 * | 8/2005 | Wang | 340/456 |
| 7,099,466 B2 | 8/2006 | Walsh | |
| D562,738 S * | 2/2008 | Young | D12/126 |
| D625,715 S * | 10/2010 | Adams, II | D14/253 |
| 8,631,983 B2 * | 1/2014 | King | 224/555 |
| 2002/0036222 A1 * | 3/2002 | Gerardi | 224/544 |
| 2005/0014536 A1 * | 1/2005 | Grady | 455/573 |
| 2007/0102612 A1 * | 5/2007 | Seil et al. | 248/311.2 |
| 2008/0019082 A1 * | 1/2008 | Krieger et al. | 361/679 |
| 2008/0296334 A1 * | 12/2008 | Carnevali | 224/558 |
| 2011/0075335 A1 * | 3/2011 | Nagami | 361/679.01 |
| 2011/0290067 A1 * | 12/2011 | Ahn et al. | 74/551.8 |

\* cited by examiner

*Primary Examiner* — J. Gregory Pickett
*Assistant Examiner* — John Cogill
(74) *Attorney, Agent, or Firm* — Woodard, Emhardt, Moriarty, McNett & Henry LLP

(57) ABSTRACT

Accessory holders and methods of displaying an accessory or a display screen of an accessory to an occupant of a vehicle are disclosed. In one aspect, the accessory holder has a lower portion configured to couple to the gear shift of a vehicle. In another aspect, the accessory holder is configured to secure a personal electronic accessory.

14 Claims, 8 Drawing Sheets

GEAR SHIFT MOUNTED ACCESSORY HOLDER

CROSS-REFERENCE TO RELATED APPLICATIONS

This application claims the benefit of U.S. Application No. 61/429,331, filed Jan. 3, 2011, which is hereby incorporated by reference in its entirety.

FIELD OF THE INVENTION

The present invention relates to automobile accessories and, more particularly, to an accessory holder which is designed to be mounted on a gear shift.

BACKGROUND OF THE INVENTION

The use of mobile phones, mp3 players and other types of hand-held personal electronic accessories has become increasing prevalent. Users often wish to utilize these devices while driving an automobile, however such use may be difficult and unsafe since the user needs both hands free to operate the vehicle. Various types of holders are available which allow an accessory to be mounted within the vehicle interior. However, most of the available holders require that some functionality be given up in order to install the holder. For example, U.S. Des. Pat. No. 402,666 discloses a support which mounts into the cup holder of a vehicle. This provides a convenient mounting location, typically between the front seats of the vehicle, but eliminates the use of the cup holder while the mount is installed.

An improved accessory holder is desired.

SUMMARY OF THE INVENTION

In one configuration, the present disclosure includes an accessory holder which includes a lower portion adapted to be mounted onto the upper end of a gear shift of a vehicle. The lower portion may be sized and formed to fit the gear shift of particular vehicle models. Slots or openings may be included in the lower portion to allow access to buttons or controls on the gear shift handle.

The holder also includes an upper portion which comprises a shelf or bracket for supporting an accessory including but not limited to a personal electronic accessory such as a cell phone, mp3 player, electronic tablet, or global positioning system (GPS) unit. In certain embodiments, the shelf may have an inset area with walls to receive the accessory and to prevent sliding. The walls may also have cutouts or openings to allow cords to be connected to the accessory and to allow access to side-mounted controls. The shelf may be angled to place the accessory at a better viewing angle for the user. In certain embodiments, the holder may be rotatable and/or includes a pivot to allow the angle of the shelf to be adjusted relative to the lower portion. In still further embodiments, the upper portion is removable from the lower portion and comprises an additional mounting device, such as a belt clip.

In some embodiments, a personal electronic accessory holder for a vehicle having a gear shift comprises a bracket arrangement having an upper portion and a lower portion; the upper portion defining a support area configured to secure a personal electronic accessory on the upper portion; and the lower portion configured to couple to the gear shift of a vehicle; wherein the upper portion is selectively positionable to orient a display screen of the personal electronic accessory on the upper portion toward an occupant of the vehicle.

A method of displaying a screen of a personal electronic accessory to an occupant of a vehicle is also disclosed. In some embodiments, the method comprises attaching a lower portion of a bracket arrangement to a handle of a gear shift in a vehicle with a gear shift; securing a personal electronic accessory within a support area defined by an upper portion of the bracket arrangement; and positioning the bracket arrangement to orient a screen of the personal electronic accessory toward an occupant of the vehicle.

Another embodiment of the present invention discloses a personal electronic accessory holder for a vehicle, the accessory holder comprising a bracket arrangement having an upper portion and a lower portion; the upper portion adjustably coupled to the lower portion and having a support area having sidewall portions substantially matching the periphery of the personal electronic accessory to secure the personal electronic accessory on the upper portion; at least one of the sidewall portions defining at least one opening situated to accommodate at least one port, jack, or control of the personal electronic accessory; and the lower portion configured to couple to a handle of a gear shift of a vehicle.

It is an object of the invention to provide an accessory holder. It is also an object of the present invention to provide a method of displaying a screen of an accessory to an occupant of a vehicle.

Further objects, features and advantages of the present invention shall become apparent from the detailed drawings and descriptions provided herein.

DESCRIPTION OF PREFERRED EMBODIMENTS

Figure 1:
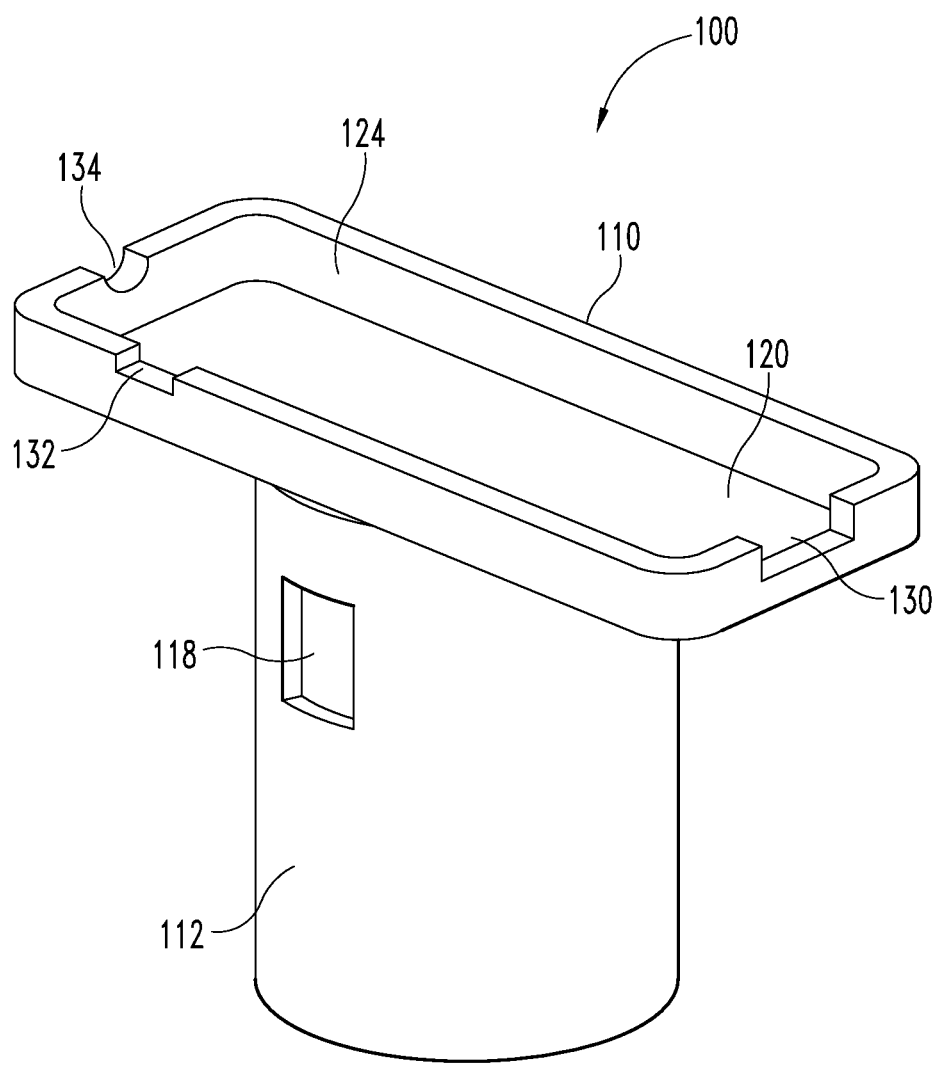
FIG. 1. is a perspective view of an accessory holder according to one embodiment of the present invention.

The use of mobile phones, mp3 players and other types of hand-held personal electronic accessories has become increasing prevalent. Users often wish to utilize these devices while driving an automobile, however such use may be difficult and unsafe since the user needs both hands free to operate the vehicle. Various types of holders are available which allow an accessory to be mounted within the vehicle interior. However, most of the available holders require that some functionality be given up in order to install the holder. Thus, an improved accessory holder is desired.

The present disclosure provides at least an accessory holder and a method of displaying an accessory and/or a display screen of an electronic accessory to an occupant of a vehicle. They accessory may include but is not limited to personal electronic accessories such as cell phones, mp3 players, electronic tablets, or global positioning systems (GPS). The screen may be electronic and may display textual and/or alpha numeric and/or graphical images. Various embodiments use a convenient mounting location, typically between the front seats of the vehicle where the mount is installed on a gear shift. In the following embodiments, an accessory holder which includes a lower portion adapted to be mounted onto the upper end of a gear shift of a vehicle is disclosed.

For the purposes of promoting an understanding of the principles of the disclosure, reference will now be made to the embodiments illustrated and specific language will be used to describe the same. It will nevertheless be understood that no limitation of the scope of the invention is thereby intended, such alterations, modifications, and further applications of the principles being contemplated as would normally occur to one skilled in the art to which the invention relates.

FIGS. 1-4 depict an example embodiment of an accessory holder, denoted generally by the numeral 100, comprising an upper portion 110 operatively connected to a lower portion 112. The lower portion 112 has an inner surface 113 that defines an interior cavity 114 (see FIG. 3) which is sized to fit snugly around the upper portion of a gear shift handle 202 of a vehicle. Lower portion 112 also has an outer surface 115. The gear shift handle 202 may be one of the type commonly found in vehicles having an automatic, continuously variable, or manual transmission. In certain embodiments, the interior cavity 114 may comprise a cylindrical shape with a circular cross section. In other embodiments, the interior cavity 114 may have a triangular, rectangular, oval, or obround cross section. As can be appreciated by one of ordinary skill in the art, other cross sections may be used and may be selected based on the shape of the gear shift handle 202 of a specific vehicle. The interior cavity 114 may be sized and shaped to match the corresponding shape of a gear shift handle 202 of a particular vehicle, including any protrusions, such as protrusion 204 (see FIG. 4), that will help to retain the holder 100 on the gear shift handle 202 once installed. The holder may be configured to fit on a floor gearshift, as shown in FIGS. 1-4, or on a steering column gearshift, in addition to other configurations.

The holder 100 may be made from any suitable material known in the art, including plastic, rubber, foam, composite and the like. In one embodiment, the lower portion 112 is made from a stretchable material, such as rubber or neoprene, which allows the lower portion 112 to elastically stretch around the gear shift handle 202 and to hold and secure the holder in place. In another embodiment, the lower portion is made from two or more rigid pieces, such as two hard plastic "half pieces", which are mated together around the gear shift handle 202 and/or gear shift stem 206 and attached using screws or other appropriate fasteners, with the interior profile of the cavity 114 in combination with the corresponding profile of the gear shift handle 202 used to retain the holder 100 in place.

In certain embodiments, the lower portion 112 may comprise one or more flexible arms which may be wrapped around the gear shift handle 202 and/or stem 206 to secure the holder 100 in place. The flexible arms are flexible enough to be adjusted by the user, yet rigid enough to retain their shape and orientation once adjusted.

The upper portion 110 and lower portion 112 may be formed by any suitable process. For instance, if the upper portion 110 and lower portion 112 are made of plastic, these components may be made by injection molding, injection compression molding, thermoforming, or blow molding, to name just a few non-limiting examples.

In certain embodiments, the interior surface 113 that defines the interior cavity 114 matches the profile of the gear shift handle 202. Various degrees of matching may be used. For example, the interior surface 113 may fully match the gear shift handle 202, such as by complementing most or all of the contours on the gear shift handle 202. Alternatively, the interior surface 113 may only approximately match the profile of the gear shift handle 202, such as by complementing only portions of the profile of the gear shift handle 202. In a further alternative, instead of matching the profile of the gear shift handle 202, the interior surface 113 may merely engage the gear shift handle 202, such as by contacting the gear shift handle 202 at a plurality of discrete locations.

The entire gear shift handle 202 or only a portion of the gear shift handle 202 that is contained within the interior cavity 114 may be matched or engaged. As can be appreciated by one of ordinary skill in the art, inner surface 113 may match or engage the entire profile of the gear shift handle 202, including protrusion 204. Alternatively, the inner surface 113 may match or engage only a portion of the gear shift handle 202.

The lower portion 112 may include one or more access openings, such as opening 118 to allow access to controls located on the gear shift handle 202, such as an overdrive control or a safety interlock which must be pressed to allow the gear shift handle 202 to be moved between gear positions. Additional openings may be provided as necessary to allow access to additional controls on the gear shift handle 202.

Upper portion 110 and lower portion 112 may be separate portions that are detachably coupled and/or pivotably coupled to one another. Alternately, upper portion 110 and lower portion 112 may be portions of a continuous piece.

Figure 2:
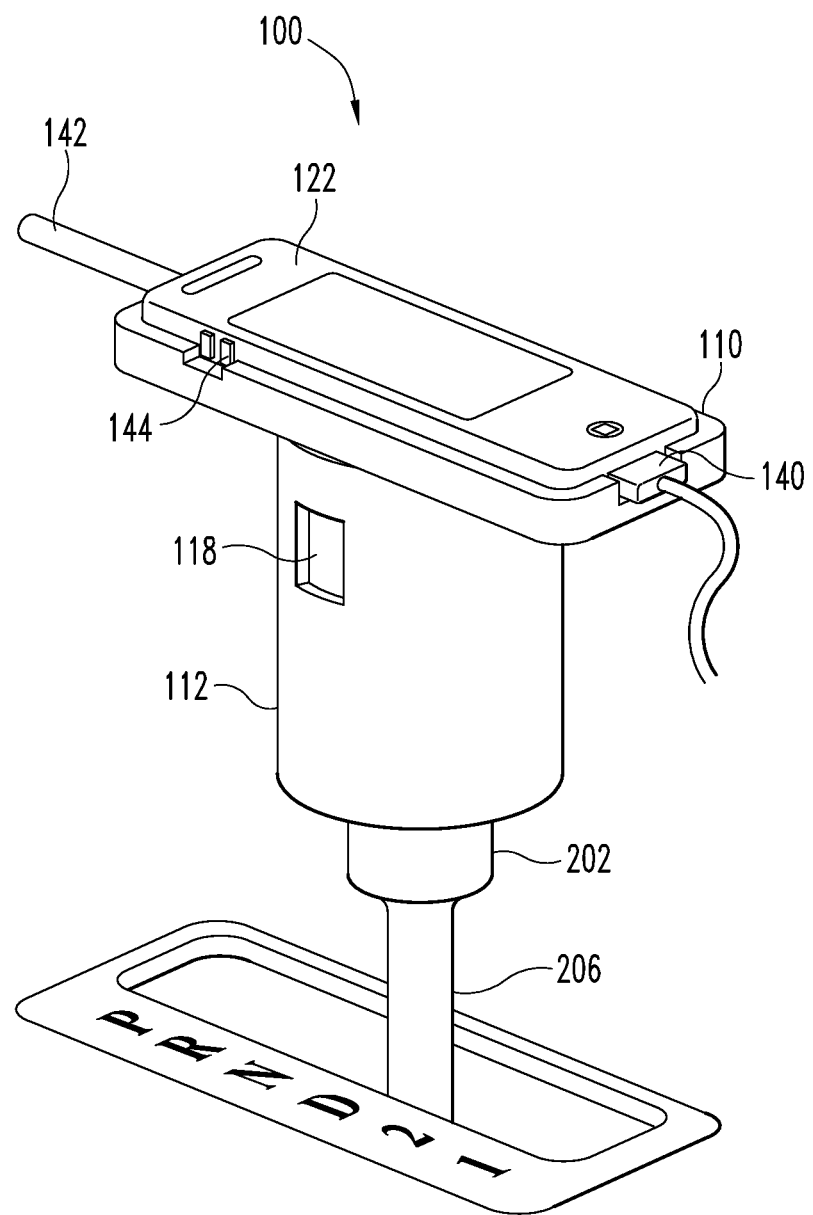
FIG. 2 is a perspective view of the accessory holder of FIG. 1 mounted on a vehicle gear shift and with an accessory mounted in the accessory holder.
Figure 3:
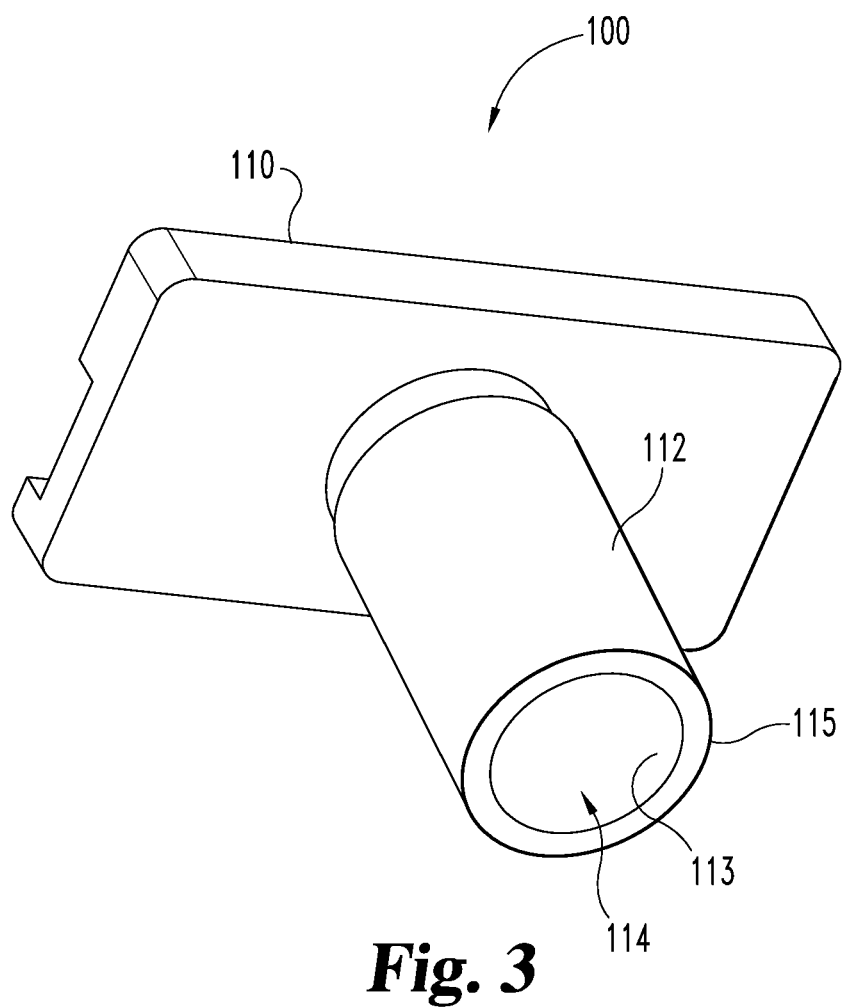
FIG. 3 is a bottom perspective view of the embodiment of FIG. 1.

The upper portion 110 of the holder 100 may comprise a shelf 120 for receiving an accessory 122 (see FIG. 2). The upper portion 110 may optionally comprise sidewalls 124 which surround the shelf 120 to help secure the accessory 122 on the shelf and prevent sliding. The shelf 120 and sidewalls 124 may optionally be sized and shaped to fit particular models or classes of accessories. The surface of the shelf 120 may optionally comprise a non-slip or rubberized material to further prevent the accessory from sliding. In certain embodiments, the surface of the shelf 120 may include hook-and-loop material, such as Velcro®, for securing the accessory 122 to the shelf 120 (with corresponding hook-and-loop material attached to the back of the accessory 122). The orientation of the upper portion 110 relative to lower portion 112 may be configured to ensure that the platform 120 sits at a suitable angle for viewing and/or using the accessory 122. For example, different relative mounting angles may be required depending on whether the holder 100 is being mounted on a floor gearshift or a steering column gearshift.

Openings 130, 132 and 134 may be included in sidewalls 124 as shown to allow access such as for cord 140 or antenna 142 or to allow access to side-mounted controls 144 while the accessory is mounted in the holder 100. The openings 130, 132 and 134 may be sized to accommodate the ports, jacks, and/or controls on the sides of a particular model of accessory. In certain embodiments, the sidewalls 124 may include one or multiple pop-out tabs which may be removed in order create openings at the locations of the controls for the particular model of accessory being used.

The sidewalls 124 may surround the shelf 120 completely or on fewer than all sides of the shelf 120. In some embodiments, the sidewalls only secure the accessory 122 on the shelf 120 on three of the four sides of the shelf 120 and/or accessory 122. This allows for the accessory 122 to be slidably inserted onto the shelf 120 and between the sidewalls 124. In further embodiments, the sidewalls 124 surround only the corner portions of the shelf 120, leaving the majority of the shelf perimeter portions open to allow for controls from a wider variety of accessory models to be accessed. In further embodiments, the sidewalls 124 may include locking tabs which extend or snap over the edges of the accessory 122 to further secure the accessory 122 within the holder 100.

Shelf 120 may also have openings to accommodate other features of the accessory 122. For example, shelf 120 may have openings to accommodate controls, connections, speakers, and/or cameras on the back side of the accessory 122 (the side of the accessory 122 facing the shelf 120). Openings in shelf 120 may also be provided to ease the removal of the accessory 122 from the holder 100 by allowing an operator to press against the back of the accessory 122 through an opening in the shelf 120; thereby ejecting the accessory 122 through the open face of the upper portion 110. Openings may also be provided in the shelf 120 and/or the sidewalls 124 to permit an operator to grasp the sidewalls of the accessory 122 to insert or withdraw the accessory 122 from the holder 100.

Figure 4:
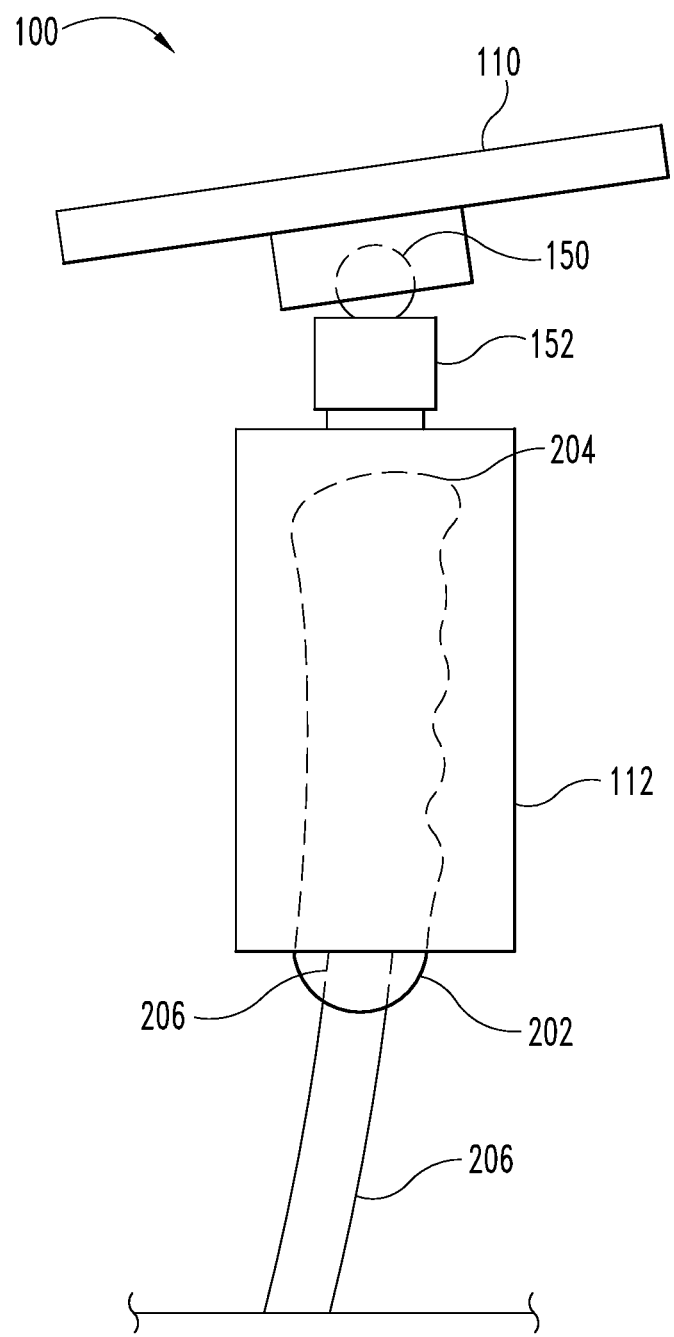
FIG. 4 is a side view of an accessory holder according to one embodiment of the present invention.

The upper portion 110 may be angled and/or rotatable relative to the gear shift handle 202 to place the accessory 122 and/or a screen or display of the accessory 122 at a convenient viewing angle for the user. In certain embodiments, the rotation of the shelf 120 may be adjusted by rotating the lower portion 112 relative to the gear shift handle 202. In other embodiments, as shown in FIG. 4, the holder 100 may comprise a pivot 150 connecting the upper portion 110 and lower portion 112. The pivot 150 allows the angle and rotation of the shelf 120 relative to the lower portion 112 to be adjusted by the user as desired. In one embodiment, the pivot 150 comprises a ball and socket joint, although other types of joints and hinges known in the art may be utilized. A telescoping member 152 may optionally be included to operably connect the upper portion 110 and the lower portion 112 and to allow the overall height of the shelf 120 relative to the lower portion 112 to be adjusted by the user. Optionally, the pivot 150 and/or the telescoping member 152 is selectively adjustable or lockable to allow or inhibit pivoting and/or telescoping of the upper portion 110.

The upper portion 110 may be optionally configured to be removable from the lower portion 112 while remaining connected to the accessory 122. For example, instead of pivot 15, holder 100 may have one or more connectors 154 (shown in FIG. 7) to detachably couple the upper portion 110 to the lower portion 112. As can be appreciated, connectors 154 may include but are not limited to hook-and-loop fasteners, snap buttons, magnets, and/or clips. In certain embodiments, multiple upper portions can be provided with each lower portion in a kit or vice versa to allow a kit to fit a specific accessory to a specific vehicle. Alternatively, the upper portion 110 may be individually purchased, perhaps depending on the purchaser's accessory 122 and/or desired connectors 154. Likewise, a desired one of multiple lower portions 112 can be individually purchased or selected to allow use customized to a variety of vehicles.

The upper portion 110 may also be configured to be attachable to other devices, once removed from the lower portion 112, using the same or a different attachment mechanism as that used to attach the upper and lower portions 110/112. As one non-limiting example, the upper portion 110 may include additional attachment devices, such as a clip for mounting the upper portion 110 to a user's belt.

In certain embodiments, the holder 100 may include a power jack or power supply function for powering and charging the accessory 122. The power jack is connected to the vehicle power system, such as by the 12V cigarette lighter or other vehicle power outlet. The holder 100 may also comprise a "docking port" having one or more connectors for powering the accessory 122 and/or connecting the accessory 122 for communication with various devices such as a car stereo or ear piece. When the accessory 122 is placed in the holder 100, the corresponding contacts in the accessory 122 will be pressed against the docking port or jack contacts, thereby creating the required power and/or communication connection. In further embodiments, the holder 100 may include a non-wired charging system, such as an inductive charger, which allows the accessory 122 to be powered and charged when mounted in the holder 100 without the need to make a wired contact connection between the holder 100 and the accessory 122.

In additional embodiments, the holder 100 may have multiple upper portions to secure more than one accessory 122 onto the holder 100. For example, two upper portions may be attached to a single lower portion 112. These upper portions may support similar accessories or different accessories. For example, the first upper portion may be used to secure a cellular telephone and the second upper portion may be used to secure an electronic tablet. In certain embodiments, the holder 100 may further comprise mounting devices for other sub-accessories, such as a stylus, ear piece, or remote microphone. The holder 100 may also be decorated with indicia, such as a logo, advertisement, or other graphic.

Figure 5:
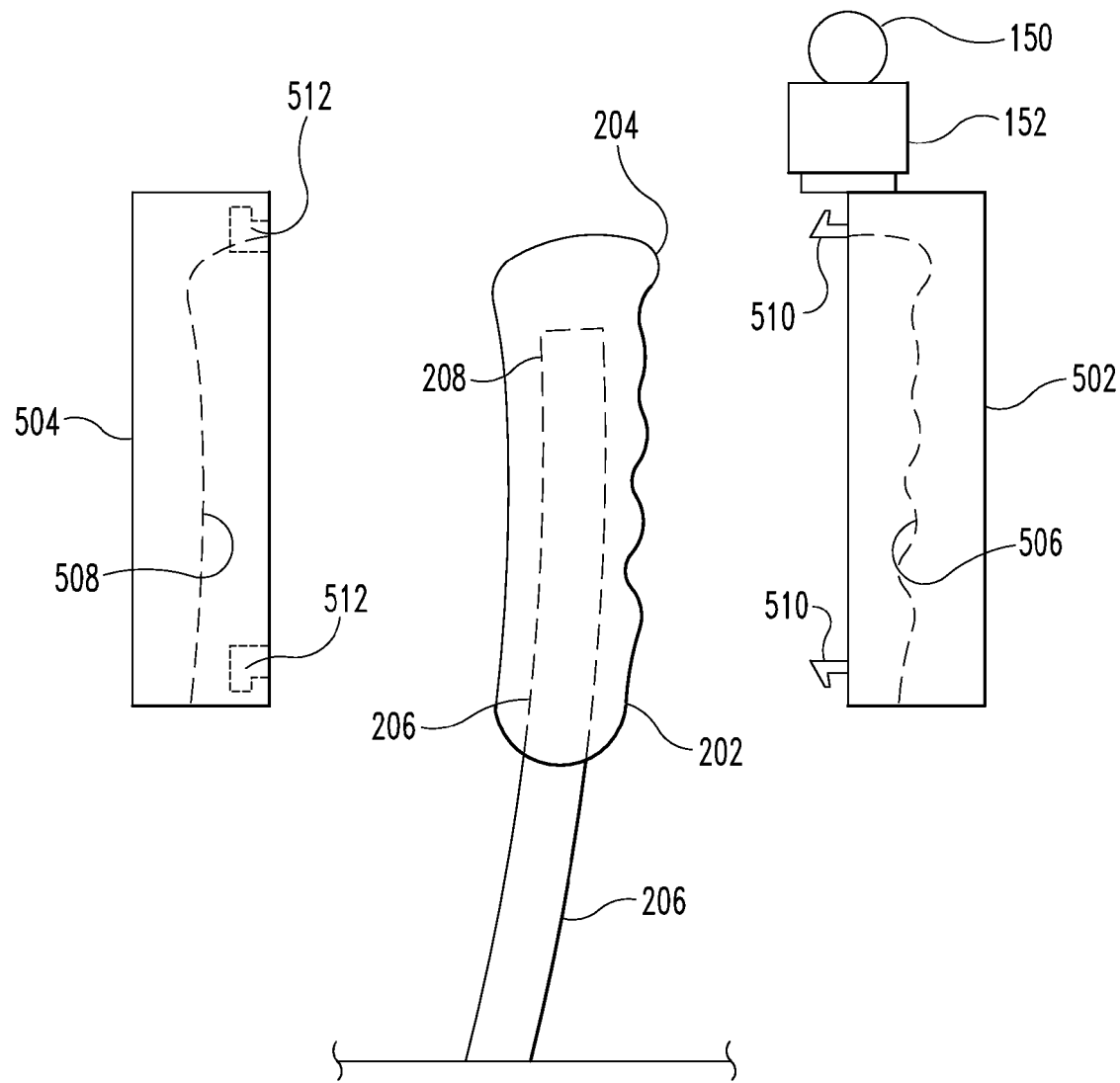
FIG. 5 is a side view of a lower portion of an accessory holder prior to assembly, according to one embodiment of the present invention.
Figure 6:
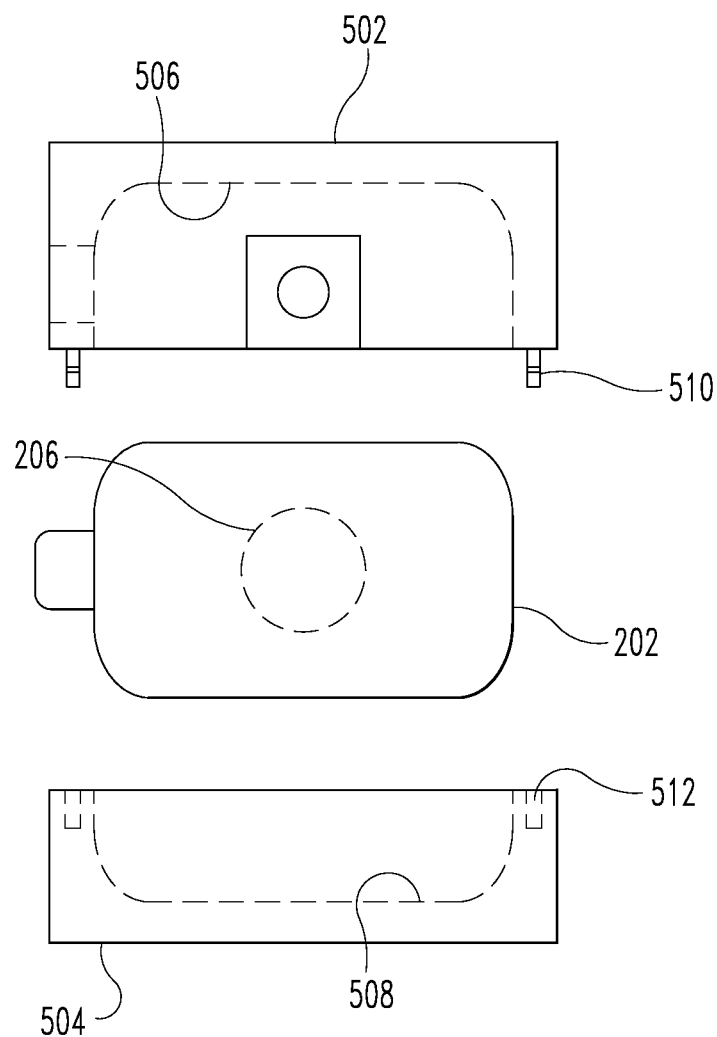
FIG. 6 is a top view of the embodiment in FIG. 5.

FIGS. 5 and 6 show one embodiment in which the lower portion is formed of a plurality of pieces which can cooperate when assembled to couple the lower portion to the gear shift handle 202. In this embodiment, the lower portion is comprised of a first piece 502 and a second piece 504. First piece 502 has a surface 506 that generally complements the front portion of the gear shift handle 202 and the protrusion 204. Second piece 504 has a surface 508 that generally complements the back portion of the gear shift handle 202. When the two pieces 502 and 504 are brought together, they define an inner cavity that has a profile substantially matching that of the gear shift handle 202.

Optionally, at least one of the first or second pieces 502/504 has alignment and/or securing extensions 510 extending towards recesses 512 in the other piece. For example, when the pieces 502 and 504 are assembled around the gear shift handle 202, extensions 510 fit inside recesses 512 and fasten pieces 502 and 504 together. As discussed above, other fasteners such as screws may also be used to attach the pieces of the lower portion.

Figure 7:
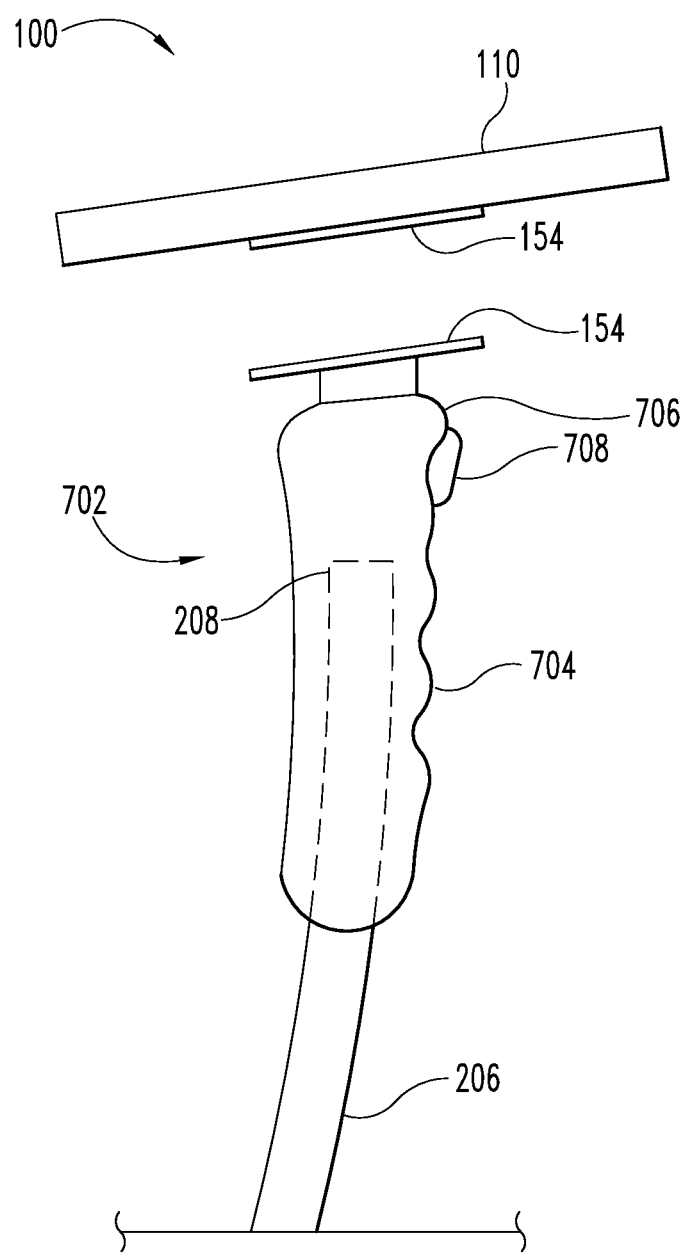
FIG. 7 is a side view of an accessory holder according to one embodiment of the present invention.

In some embodiments, as shown in FIG. 7, lower portion 702 may be configured and arranged to receive the gear shift stem 206 instead of the gear shift handle 202. Gear shift stem 206 may have an attachment portion 208 that has threads, recesses, or protrusions configured and arranged for fastening the gear shift stem 206 to a gear shift handle 202. Lower portion 702 is configured and arranged to attach to the gear shift stem 206 at attachment portion 208 in a fashion similar to the attachment of gear shift handle 202 to gear shift stem 206. For example, the inner surface of lower portion 702 may have threads that correspond with threads on the gear shift stem 206 at the attachment portion 208.

In some embodiments, also shown in FIG. 7, the lower portion 702 may have a profile similar to that of a gear shift handle. For example, the outer surface 704 of the lower portion 702 may have a shape similar to the outer surface of a gear shift handle. The outer surface 704 may have one or more protrusions 706 similar to the protrusions of the gear shift handle (see protrusion 204, FIGS. 4-6) and/or one or more controls 708 similar to those found on a gear shift handle.

Optionally, the controls 708 replace controls on the former gear shift handle used in the vehicle, such as a safety interlock. Optionally, one or more controls 708 may control ancillary accessories such as the accessory 122 and/or a radio in the vehicle, to name a few non-limiting examples.

Figure 8:
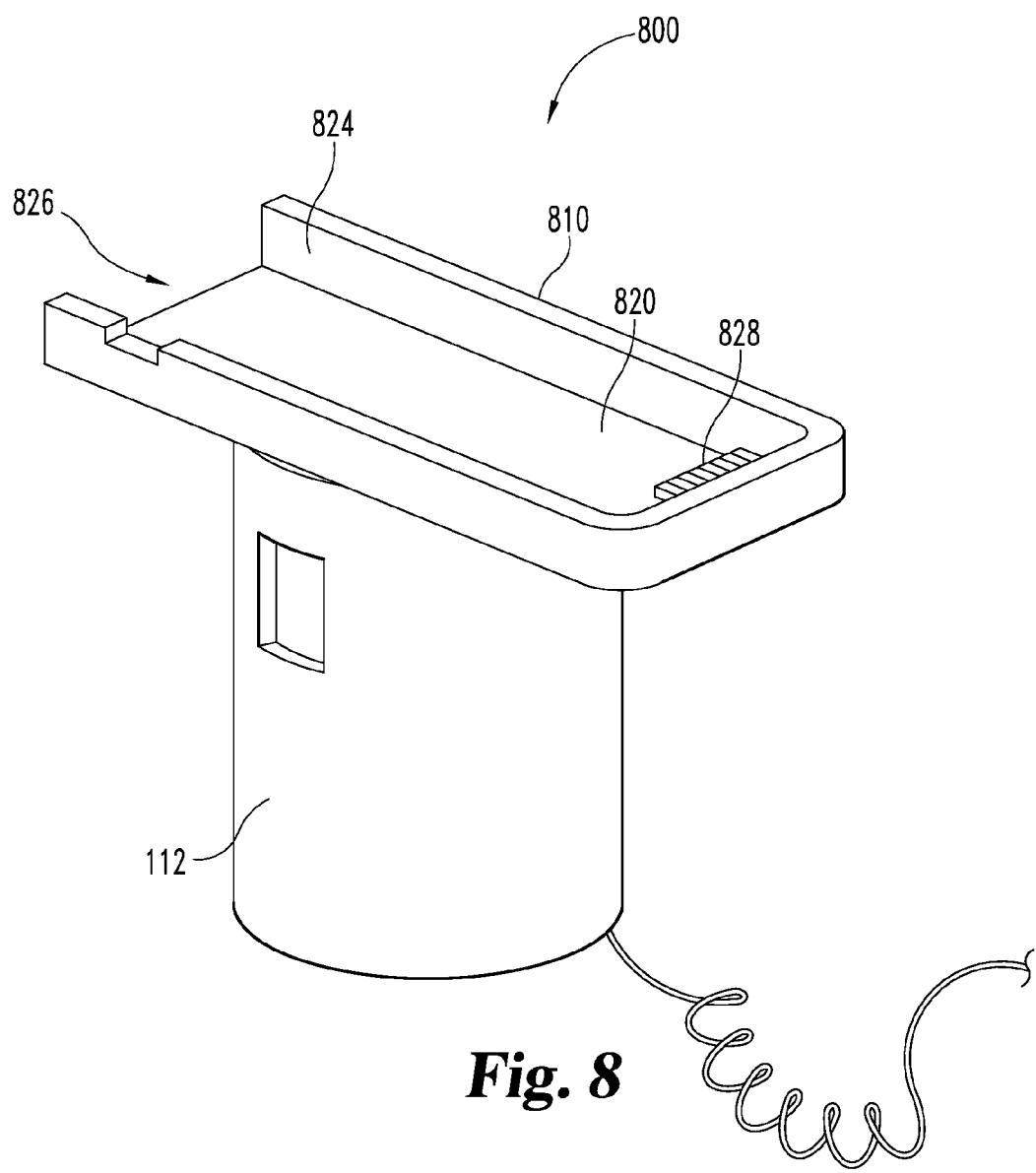
FIG. 8 is a perspective view of an accessory holder according to one embodiment of the present invention.

FIG. 8 shows another embodiment of the accessory holder. In this embodiment, the accessory holder 800 comprises an upper portion 810 that has shelf 820 and sidewalls 824. One end of the shelf 820 is free of sidewalls 824 and therefore permits insertion of an accessory along the direction shown by arrow 826. Holder 800 also has an electrical connector 828 on a sidewall 824 of the upper portion 810 that is configured to electronically connect the accessory with an electronic circuit of the vehicle. The electrical connector 828 may be positioned on the shelf 820 or in/on another portion of the upper portion depending on the arrangement of the upper portion 810. The electrical connector 828 may be connected to the accessory 122 when the accessory 122 is secured to the upper portion 810. The electrical connector 828 may be fixed or pivotable to allow for connection to the accessory 122.

The electrical connector 828 may be used to power and/or charge the accessory contained in the upper portion 810. Electrical connector 828 may also be used to transmit signals between the accessory and an electronic circuit of the vehicle. For example, connector 828 may transmit audio signals to an input in a stereo in the vehicle. Additional connectors may be included in upper portion 810, including in and/or on sidewalls 824 and/or shelf 820, to accommodate other uses of the accessory.

The above discussed embodiments may be used to in combination with a method to display an accessory to an occupant of a vehicle. The method of displaying an accessory may include the steps of (1) attaching a lower portion of a bracket arrangement to a gear shift in a vehicle with a gear shift; (2) securing an accessory to an upper portion of the bracket arrangement; and (3) positioning the bracket arrangement to orient the accessory or a display screen of the accessory to an occupant of the vehicle. Securing the personal electronic accessory may be done before and/or after attaching the lower portion to a gear shift, and securing may be done before and/or after positioning the bracket arrangement to orient a screen of the accessory.

If the upper portion of the bracket arrangement has sidewall portions and/or a recess, securing the accessory may include positioning the accessory between sidewall portions or within the recess. There may be a gap between the accessory and the sidewall portions, but it is preferred that the sidewall portions limit the movement of the accessory relative to the upper portion.

Securing the accessory may also include using an attachment means such as a non-slip or rubberized material to prevent the accessory from sliding off of the upper portion. For example, securing may include using hook-and-loop material, such as Velcro® for attaching the accessory to the upper portion.

For accessories having ports, jacks, and/or controls on their sides and/or back, securing the accessory may also include arranging at least one opening defined by a sidewall portion and/or shelf portion to allow access to at least one port, jack, and/or control on the sidewall and/or the back of personal electronic accessory.

If the upper portion includes at least one connector for the accessory, such as an electrical connector for electronically connecting the accessory to the vehicle, the method may further include the step of connecting the accessory to the vehicle's circuitry. Depending on the arrangement of the upper portion and the accessory, connecting the accessory, or electronically connecting the accessory, may be performed during the step of securing the accessory.

The step of attaching the lower portion of the bracket assembly to a gear shift stem and/or a gear shift handle may also include retaining a gear shift stem and/or gear shift handle at least partially within a cavity defined by the lower portion. The gear shift stem/handle may or may not be retained within a cavity that matches the profile of the stem/handle. For stems/handles that have controls on the portion retained by the lower portion, attaching the lower portion may also comprise arranging and/or aligning at least one access opening defined by the lower portion with at least one control on the stem/handle so as to allow access to the control when the lower portion is attached to the gear shift stem/handle. Attaching the lower portion may comprise assembling multiple pieces that cooperate to retain the stem/handle. Attaching may also include retaining the gear shift stem and/or the gear shift handle within the lower portion.

Attaching the lower portion typically includes retaining a handle of a gear shift of the vehicle at least partially within a lower cavity While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

What is claimed is:

1. A personal electronic accessory holder for a vehicle having a gear shift with a gear shift handle having an outer surface defining a handle profile, comprising:
    a bracket arrangement having an upper portion and a lower portion;
    said upper portion defining a support area configured to secure a personal electronic accessory on said upper portion; and
    said lower portion defining a cavity having an open end and a closed end, the cavity configured to receive the handle of the gear shift of a vehicle through the open end;
    wherein said upper portion is selectively positionable to orient a display screen of the personal electronic accessory on said upper portion toward an occupant of the vehicle;
    wherein said cavity is sized and shaped to match the gear shift handle; and
    wherein said lower portion has an interior surface defining a profile that matches and is complementary in shape to the handle profile;
    said upper portion is pivotably coupled to said lower portion;
    said support area has sidewall portions for securing the personal electronic accessory within the support area;
    at least one of said sidewall portions defines at least one opening situated to allow access to at least one port, jack, or control on a sidewall of the personal electronic accessory;
    said lower portion defines at least an access opening configured to align with and enable an operator to operate at least one control on the gear shift handle when said lower portion is coupled to the gear shift handle.

2. The holder of claim 1, wherein:
    said sidewall portions form a profile configured to match the profile of the personal electronic accessory.

3. The holder of claim 1, comprising:
    at least one electrical connector in said support area wherein said connector is configured to electronically connect the personal electronic accessory with an electronic circuit of the vehicle.

4. The holder of claim 1, wherein:
said lower portion is formed of pieces configured to cooperate when assembled to couple said lower portion to gear shift handle.

5. A personal electronic accessory holder for a vehicle having a gear shift with a gear shift handle having one or more controls located thereon, comprising:
a bracket arrangement having an upper portion and a lower portion;
said upper portion adjustably coupled to said lower portion and having a support area having sidewall portions configured to substantially match the periphery of the personal electronic accessory to secure the personal electronic accessory on said upper portion;
at least one of said sidewall portions defining at least one opening situated to accommodate at least one port, jack, or control of the personal electronic accessory; and
said lower portion having an inner surface that defines a cavity having an open end and a closed end, the cavity configured to receive the gear shift handle;
wherein said cavity extends in a downward direction from said closed end to said open end, with said open end being positioned on a lower face of said lower portion;
wherein said lower portion defines one or more openings through the wall of the lower portion and into said cavity so as to allow access to the one or more controls located on the gear shift handle when the gear shift handle is received within the cavity; and
wherein said lower portion is made from a stretchable material so as to elastically stretch around and compress the ear shift handle when the ear shift handle is received within the cavity.

6. The holder of claim 5, comprising:
at least one electrical connector in said support area wherein said connector is configured to electronically connect the personal electronic accessory with an electronic circuit of the vehicle.

7. A method of displaying a screen of a personal electronic accessory to an occupant of a vehicle having a gear shift handle with an outer surface defining a handle profile, comprising:
attaching a lower portion of a bracket arrangement having an upper portion and a lower portion to the gear shift handle, said upper portion defining a support area configured to secure a personal electronic accessory on said upper portion, said lower portion defining a cavity having an open end and a closed end, the cavity configured to receive the gear shift handle through the open end, wherein said upper portion is selectively positionable to orient a display screen of the personal electronic accessory on said upper portion toward an occupant of the vehicle, wherein said cavity is sized and shaped to match the gear shift handle, and wherein said lower portion has an interior surface defining a profile that matches and is complementary in shape to the handle profile, said upper portion is pivotably coupled to said lower portion, said support area has sidewall portions for securing the personal electronic accessory within the support area, at least one of said sidewall portions defines at least one opening situated to allow access to at least one port, jack, or control on a sidewall of the personal electronic accessory, said lower portion defines at least an access opening configured to align with and enable an operator to operate at least one control on the gear shift handle when said lower portion is coupled to the gear shift handle;
securing a personal electronic accessory within a support area defined by an upper portion of said bracket arrangement; and
positioning said bracket arrangement to orient a screen of the personal electronic accessory toward an occupant of the vehicle so as to display a screen of the personal electronic accessory to the occupant of the vehicle.

8. The method of claim 7, wherein:
securing the personal electronic accessory includes positioning the personal electronic accessory between sidewall portions of said support area.

9. The method of claim 8, wherein:
securing a personal electronic accessory includes arranging at least one opening defined by said sidewall portions to allow access to at least one port, jack, or control on a sidewall of the personal electronic accessory.

10. The method of claim 8, wherein:
said sidewall portions form a profile matching the profile of the personal electronic accessory.

11. The method of claim 7, further comprising:
electronically connecting the personal electronic accessory with an electronic circuit of the vehicle.

12. The method of claim 7, wherein:
attaching a lower portion includes retaining the gear shift handle at least partially within a lower cavity defined by said lower portion.

13. The method of claim 12, comprising:
aligning at least one access opening defined by said lower portion with at least one control on the gear shift handle to allow access to the control when said lower portion is attached to the gear shift handle.

14. The method of claim 12, comprising:
assembling cooperating pieces to form said lower portion to attach said lower portion to the gear shift handle.

* * * * *